United States Patent
Dang et al.

(10) Patent No.: US 9,042,045 B1
(45) Date of Patent: May 26, 2015

(54) DISK DRIVE ADJUSTING A DEFECT THRESHOLD WHEN SCANNING FOR DEFECTIVE SECTORS

(75) Inventors: Dean V. Dang, Fountain Valley, CA (US); Kek Ming Chua, Rancho Santa Margarita, CA (US); King S. Goh, Las Flores, CA (US); Prakash Balasubramaniam, Lake Forest, CA (US); Ming Jin, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 2106 days.

(21) Appl. No.: 11/933,662

(22) Filed: Nov. 1, 2007

(51) Int. Cl.
*G11B 27/36* (2006.01)
*G11B 5/09* (2006.01)
*G11B 5/596* (2006.01)
*G11B 20/18* (2006.01)
*G11B 20/12* (2006.01)

(52) U.S. Cl.
CPC ...... *G11B 20/1816* (2013.01); *G11B 2020/183* (2013.01); *G11B 2020/1282* (2013.01)

(58) Field of Classification Search
USPC ......................................... 369/44.11
See application file for complete search history.

(56) References Cited

U.S. PATENT DOCUMENTS

| | | |
|---|---|---|
| 5,150,050 A | 9/1992 | Genheimer et al. |
| 5,216,655 A | 6/1993 | Hearn et al. |
| 5,280,395 A | 1/1994 | Matsuzaki |
| 5,333,140 A | 7/1994 | Moraru et al. |
| 5,812,334 A * | 9/1998 | Behrens et al. ................. 360/40 |
| 5,895,438 A | 4/1999 | Yomtoubian |
| 6,204,660 B1 * | 3/2001 | Lee ................. 324/212 |
| 6,219,814 B1 | 4/2001 | Coker et al. |
| 6,223,303 B1 | 4/2001 | Billings et al. |
| 6,239,931 B1 | 5/2001 | Chung et al. |
| 6,292,913 B1 * | 9/2001 | Son ................. 714/718 |
| 6,332,204 B1 | 12/2001 | Russell |
| 6,366,081 B1 | 4/2002 | Tan et al. |
| 6,384,999 B1 | 5/2002 | Schibilla |
| 6,405,342 B1 | 6/2002 | Lee |
| 6,490,691 B1 * | 12/2002 | Kimura et al. ................. 714/5.1 |
| 6,606,211 B1 | 8/2003 | Lim et al. |
| 6,654,193 B1 | 11/2003 | Thelin |
| 6,691,255 B1 | 2/2004 | Rothberg et al. |
| 6,704,153 B1 | 3/2004 | Rothberg et al. |
| 6,731,442 B2 | 5/2004 | Jin et al. |
| 6,781,688 B2 * | 8/2004 | Kren et al. ................. 356/237.4 |
| 6,906,883 B2 * | 6/2005 | Chu et al. ................. 360/75 |
| 6,947,232 B2 * | 9/2005 | Lim et al. ................. 360/31 |
| 6,950,967 B1 | 9/2005 | Brunnett et al. |
| 7,050,252 B1 | 5/2006 | Vallis |
| 7,072,129 B1 * | 7/2006 | Cullen et al. ................. 360/31 |
| 7,656,763 B1 * | 2/2010 | Jin et al. ................. 369/53.15 |
| 8,014,094 B1 | 9/2011 | Jin |

(Continued)

*Primary Examiner* — Regina N Holder

(57) ABSTRACT

A disk drive is disclosed including a disk having a plurality of sectors, and a head actuated over the disk. A defect threshold is initialized, and a first sector is read to generate a first read signal. The first read signal is processed to detect a defect in the first sector relative to the defect threshold. After detecting the defect, the defect threshold is adjusted and the first sector is reread to generate a second read signal. The second read signal is processed to detect the defect in the first sector relative to the adjusted defect threshold.

25 Claims, 5 Drawing Sheets

(56) References Cited

U.S. PATENT DOCUMENTS

| | | |
|---|---|---|
| 2001/0046196 A1 | 11/2001 | McKernan |
| 2002/0114506 A1* | 8/2002 | Hiroi et al. .................... 382/149 |
| 2004/0153949 A1 | 8/2004 | Ro et al. |
| 2006/0013095 A1* | 1/2006 | Liu et al. .................... 369/53.15 |
| 2006/0056088 A1 | 3/2006 | Kudoh et al. |
| 2006/0126204 A1 | 6/2006 | Taniguchi et al. |
| 2007/0089031 A1 | 4/2007 | Huffman et al. |
| 2008/0262643 A1 | 10/2008 | Creigh et al. |

\* cited by examiner

DISK DRIVE ADJUSTING A DEFECT THRESHOLD WHEN SCANNING FOR DEFECTIVE SECTORS

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

The data sectors are typically scanned for defects, for example, during a manufacturing process or while the disk drive is in the field. The defect procedure typically involves writing a test pattern to a data sector, reading the test pattern from the data sector, and processing the read signal to detect a defect relative to a defect threshold. If the data sector is determined to be defective, it is typically "mapped out" by either skipping the data sector (sector slipping), or by remapping a logical block address (LBA) associated with the defective data sector to a spare data sector (relocating the data sector). Data sectors may also be mapped out if a defect is detected in one or more of the embedded servo sectors, for example, by mapping out the data sectors of an entire or partial data track.

It is desirable to verify that a sector is actually defective before mapping out one or more data sectors since mapping out data sectors decreases the capacity as well as the performance of the disk drive. However, it is also desirable to ensure defective sectors are not missed in order to avoid catastrophic data loss while the disk drive is in the field.

DETAILED DESCRIPTION OF EMBODIMENTS OF THE INVENTION

Figure 1:
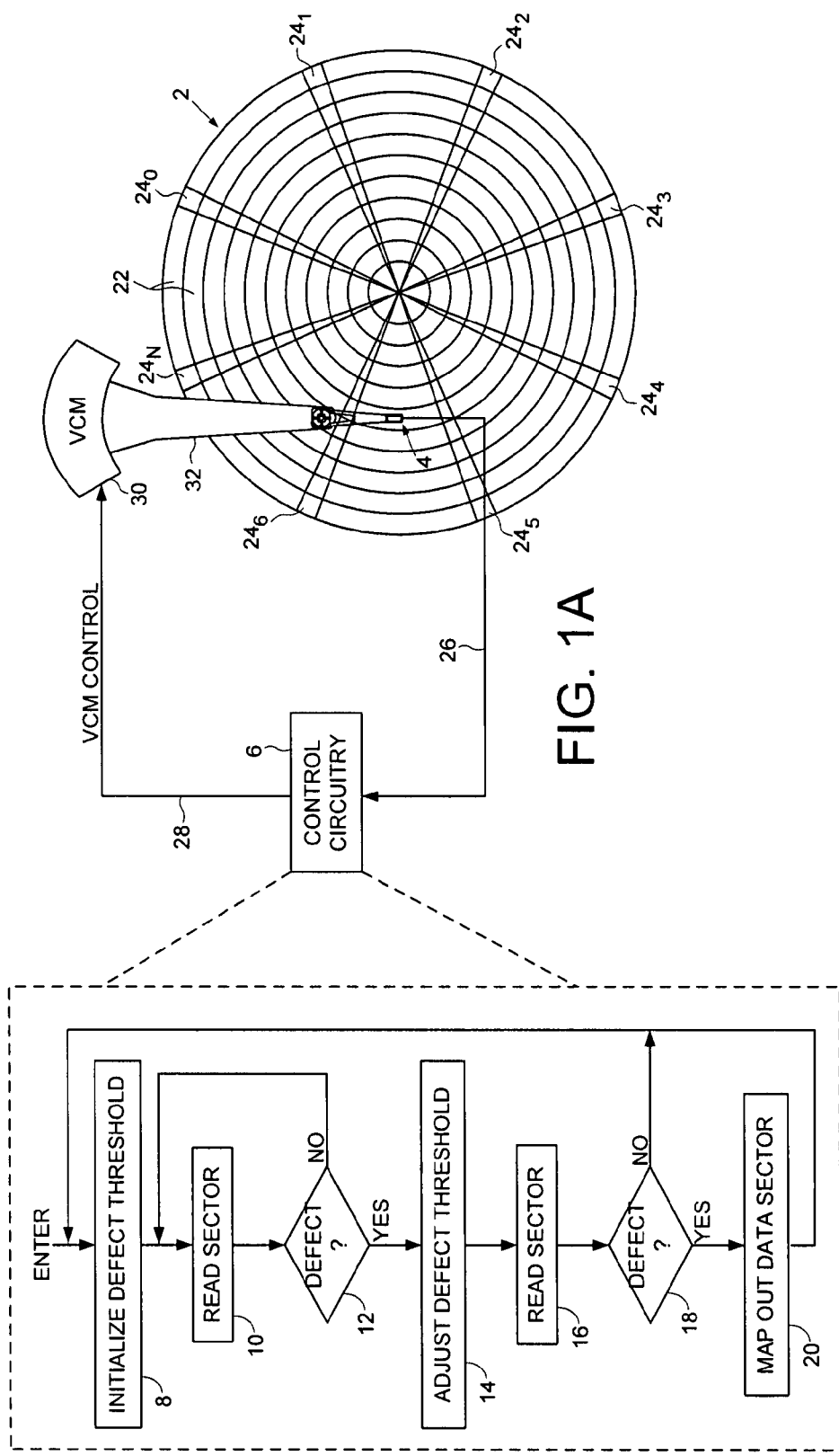
FIG. 1A shows a disk drive according to an embodiment of the present invention including a disk comprising data sectors and embedded servo sectors, a head actuated over the disk, and control circuitry.
FIG. 1B is a flow diagram executed by the control circuitry for adjusting a defect threshold when performing a defect scan of the disk according to an embodiment of the present invention.

FIG. 1A shows a disk drive according to an embodiment of the present invention including a disk 2 having a plurality of sectors, and a head 4 actuated over the disk 2. Control circuitry 6 within the disk drive executes the flow diagram of FIG. 1B to detect a defective sector according to an embodiment of the present invention. A defect threshold is initialized (step 8), and a first sector is read to generate a first read signal (step 10). The first read signal is processed to detect a defect in the first sector relative to the defect threshold (step 12). After detecting the defect, the defect threshold is adjusted (step 14) and the first sector is reread to generate a second read signal (step 16). The second read signal is processed to detect the defect in the first sector relative to the adjusted defect threshold (step 18).

In one embodiment, a data sector is mapped out (step 20 of FIG. 1B) after the defect is detected relative to the adjusted defect threshold, wherein mapping out the data sector may involve skipping the data sector (sector slipping) or remapping a logical block address (LBA) associated with the data sector to a spare data sector (relocating the data sector). The defect scanning procedure in the embodiments of the present invention may be performed during manufacturing (e.g., prior to low level formatting), or while the disk drive is in the field (e.g., when detecting grown defects).

In the embodiment of FIG. 1A, the disk 2 comprises a plurality of tracks 22, wherein each track 22 comprises a plurality of data sectors and embedded servo sectors $24_0$-$24_N$. The control circuitry 6 processes the read signal 26 emanating from the head 4 to demodulate the embedded servo sectors $24_0$-$24_N$ and generate a position error signal (PES) representing a radial offset of the head 4 from a target track 22. The control circuitry 6 processes the PES with a suitable servo compensator to generate a control signal 28 applied to a voice coil motor (VCM) 30. The VCM 30 rotates an actuator arm 32 about a pivot in order to actuate the head 4 radially over the disk 2 in a direction that decreases the PES.

In one embodiment, the sector being defect scanned comprises a data sector, and in another embodiment the sector being defect scanned comprises a servo sector. In one embodiment when the sector being defect scanned comprises a servo sector, the control circuitry 6 evaluates the PES to determine whether the servo sector is defective. For example, the control circuitry 6 may detect a defect in a servo sector if the PES exceeds a defect threshold. If a defective servo sector is detected, the defect threshold is increased and the servo sector reread to verify the defect. If the defect is detected in the servo sector relative to the adjusted defect threshold, one or more data sectors may be mapped out (e.g., an entire track may be mapped out or one or more wedges of data sectors between consecutive servo sectors within a track may be mapped out).

Figure 2:
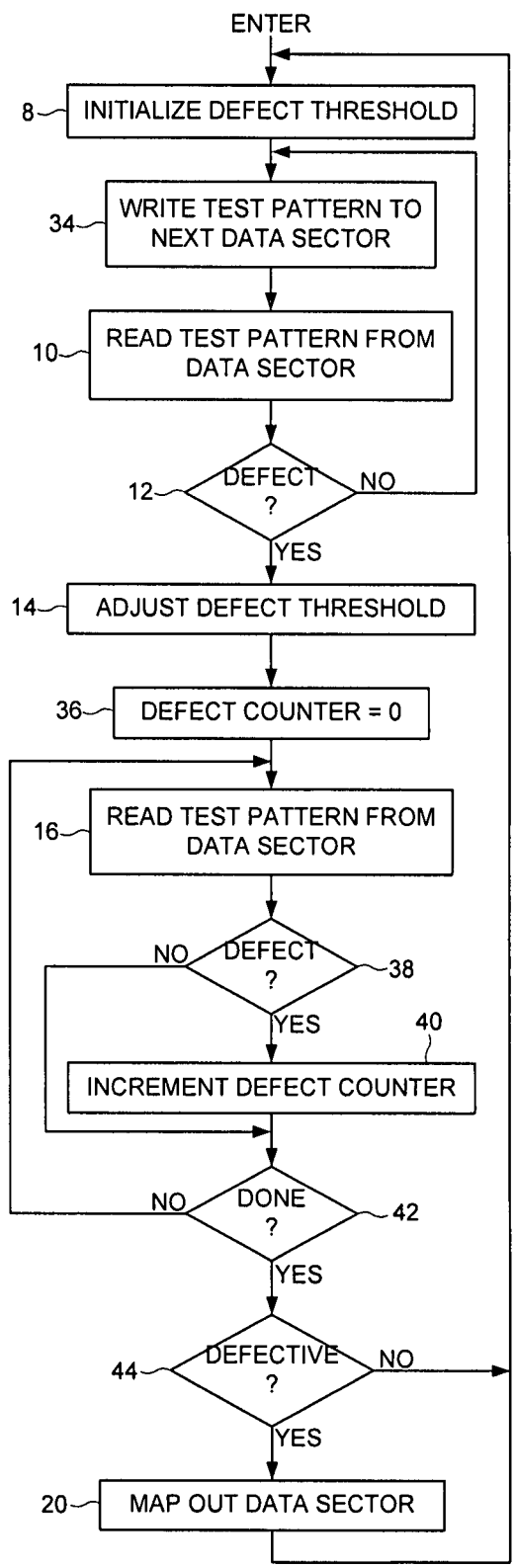
FIG. 2 is a flow diagram executed by the control circuitry wherein a data sector is mapped out if after adjusting the defect threshold the defect is detected at least M out of N times according to an embodiment of the present invention.

FIG. 2 is a flow diagram executed by the control circuitry 6 according to the embodiment wherein the sector being defect scanned comprises a data sector. The defect threshold is initialized (step 8) and a test pattern (e.g., a 2T test pattern) is written to the data sector (step 34). The test pattern is read from the data sector (step 10) to detect a defect in the data sector (step 12). After detecting the defect, the defect threshold is adjusted (step 14) and a defect counter is initialized to zero (step 36). The test pattern is reread from the data sector (step 16) to detect the defect relative to the adjusted defect threshold. When the defect is detected (step 38), the defect counter is incremented (step 40). After reading the test pattern from the data sector N times (step 42), the control circuitry 6 identifies the data sector as defective if the defect counter indicates the defect was detected at least M out of N times (step 44). If the data sector is determined to be defective (step 44), the data sector may be mapped out (step 20).

In one embodiment, the test pattern is written to each data sector individually by first synchronizing to a data field within each data sector. For example, in one embodiment each data sector comprises a preamble for synchronizing timing recovery and gain control, and a sync mark for detecting the beginning of the data field. In an alternative embodiment, the test pattern is written over an entire wedge of data sectors (the disk space between consecutive servo sectors). When a defect is detected when reading the test pattern from the wedge, the location of the defect is correlated with the corresponding data sector that needs to be mapped out. In an alternative embodiment, the data prewritten to a sector (e.g., preamble data, sync mark data, user data, or servo data) may be used to defect scan a sector.

The defect threshold may be adjusted in any suitable manner depending on how the defect is detected. In one embodiment, the defect threshold is adjusted by increasing the defect threshold, and in another embodiment, the defect threshold is adjusted by decreasing the defect threshold. In one embodiment, the defect threshold is adjusted to decrease the probability that the defect will be detected relative to the adjusted defect threshold. In an example embodiment shown in FIGS. 4A-4C, the defect is detected when the amplitude of the read signal falls below the defect threshold. The defect threshold is initialized to a high level to increase the probability that a defect will be detected, and when a defect is detected, the defect threshold is decreased to decrease the probability that the defect will be detected. In this manner, essentially every marginal sector that may be defective is first identified using the higher level defect threshold, and then the sector is further scrutinized using the lower level defect threshold to verify that the sector is actually defective before mapping out one or more data sectors.

The defect may be detected in the sector using any suitable technique. FIGS. 3A-3F show various embodiments of control circuitry 6 for detecting the defect in the sector, including various defect thresholds which may be increased or decreased. In one embodiment, the control circuitry 6 implements a single defect detector, and in an alternative embodiment, the control circuitry 6 implements multiple defect detectors that operate in parallel.

Figure 3A:
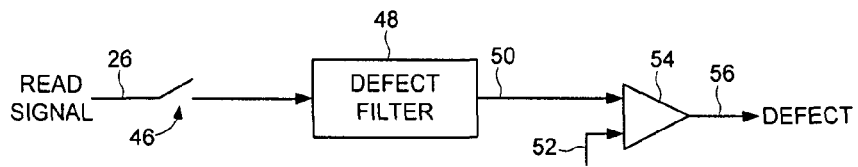
FIGS. 3A-3F show various embodiments of control circuitry for detecting the defect according to an embodiment of the present invention.

In the embodiment of FIG. 3A, the read signal 26 is sampled 46, and the read signal samples filtered by a defect filter 48 having an impulse response matched to a defect signature. When the output 50 of the defect filter 48 exceeds a defect threshold 52 at comparator 54, the defect 56 is detected. After detecting the defect 56, the defect threshold 52 is increased to decrease the probability that the defect 56 will be detected again during the verification phase.

Figure 3B:
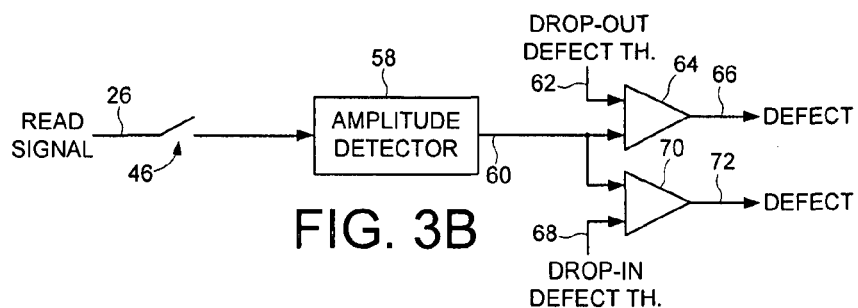

In the embodiment of FIG. 3B, the control circuitry 6 comprises an amplitude detector 58 which processes the read signal samples to detect deviations in the amplitude of the read signal. When the output 60 of the amplitude detector 58 falls below a drop-out defect threshold 62 at comparator 64, a drop-out defect 66 is detected. When the output 60 of the amplitude detector 58 rises above a drop-in defect threshold 68 at comparator 70, a drop-in defect 72 is detected. After detecting a defect, the corresponding threshold is adjusted in order to decrease the probability that the defect will be detected during the verification phase.

Figure 3C:
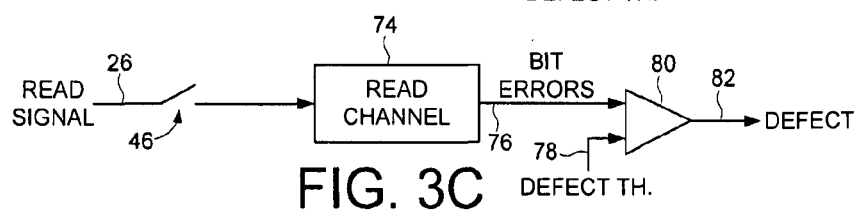

In the embodiment of FIG. 3C, the control circuitry 6 comprises a read channel 74 including a digital data detector for detecting an estimated data sequence from the read signal samples. A number of bit errors 76 is generated relative to the estimated data sequence and the correct data sequence (e.g., by comparing the estimated data sequence to a known data sequence, or by using an error correction code). When the number of bit errors 76 (or symbol errors) exceeds a defect threshold 78 at comparator 80, a defect 82 is detected. After detecting the defect 82, the defect threshold 78 is increased to decrease the probability that the defect 82 will be detected again during the verification phase.

Figure 3D:
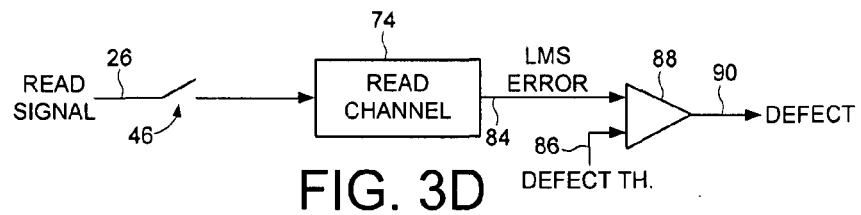

In the embodiment of FIG. 3D, the read channel 74 comprises suitable circuitry for generating a least mean square (LMS) error 84 between the read signal samples and expected signal samples. When the LMS error 84 exceeds a defect threshold 86 at comparator 88, a defect 90 is detected. After detecting the defect 90, the defect threshold 86 is increased to decrease the probability that the defect 90 will be detected again during the verification phase.

Figure 3E:
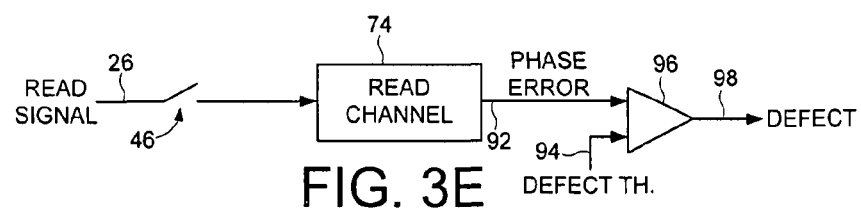

Any suitable component in the read channel 74 may be employed to detect a defect. In the embodiment of FIG. 3E, a phase error 92 is generated by timing recovery circuitry which synchronizes to the read signal samples (e.g., using a phase-locked loop). When the phase error 92 exceeds a defect threshold 94 at comparator 96, a defect 98 is detected. After detecting the defect 98, the defect threshold 94 is increased to decrease the probability that the defect 98 will be detected again during the verification phase.

Figure 3F:
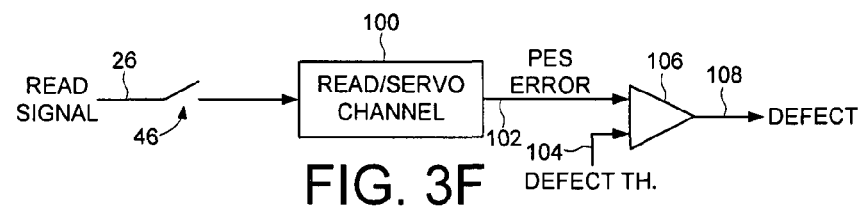

In the embodiment of FIG. 3F, the control circuitry 6 comprises a read channel 100 including servo demodulation circuitry for demodulating the embedded servo sectors $24_0$-$24_N$ to generate a position error signal (PES) 102 representing a radial offset of the head 4 from a target track 22. When the PES 102 exceeds a defect threshold 104 at comparator 106, a defect 108 is detected in one or more of the servo sectors. After detecting the defect 108, the defect threshold 104 is increased to decrease the probability that the defect 108 will be detected again during the verification phase.

Figure 4A:
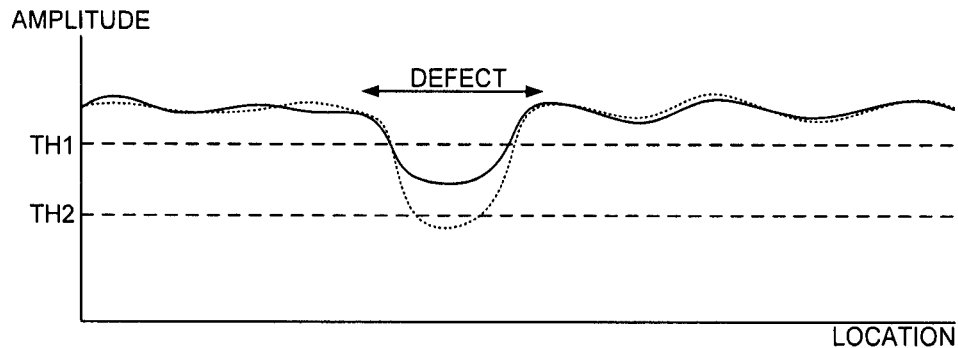
FIGS. 4A-4C show an embodiment of the present invention wherein a drop-out defect is detected when the read signal amplitude falls below a defect threshold.
Figure 4B:
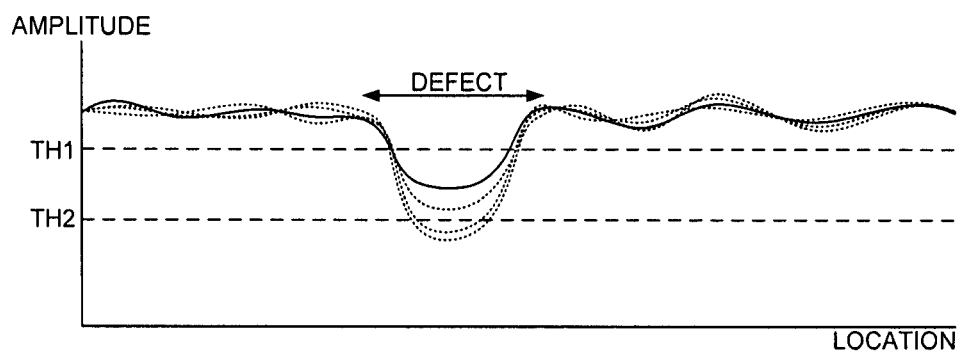
Figure 4C:
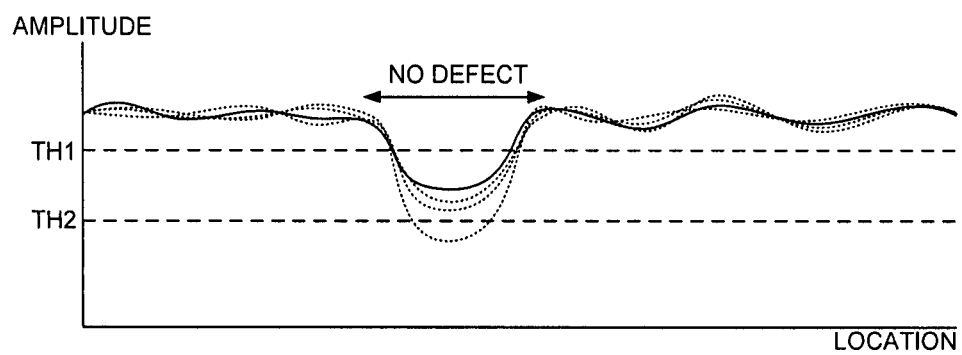

FIGS. 4A-4C illustrate an embodiment of the present invention wherein the control circuitry 6 comprises an amplitude detector for detecting drop-out defects when the amplitude of the read signal falls below a defect threshold. The defect threshold is initialized to a high level TH1, and when the amplitude of the read signal falls below the defect threshold TH1, a defect is detected. After detecting the defect, the defect threshold is decreased to a lower level TH2 and the defect verified only if the read signal falls below the defect threshold TH2 at least once during a retry operation, as illustrated in FIG. 4A.

In the embodiment of FIG. 4B, the defect is verified only if the read signal amplitude falls below the adjusted defect threshold (at level TH2) at least M out of N times (2 out 3 times in the example shown). As illustrated in FIG. 4C, there is no defect because the read signal amplitude fell below the adjusted defect threshold (at level TH2) less than M out of N times (1 out of 3 times in the example shown).

Figure 5A:
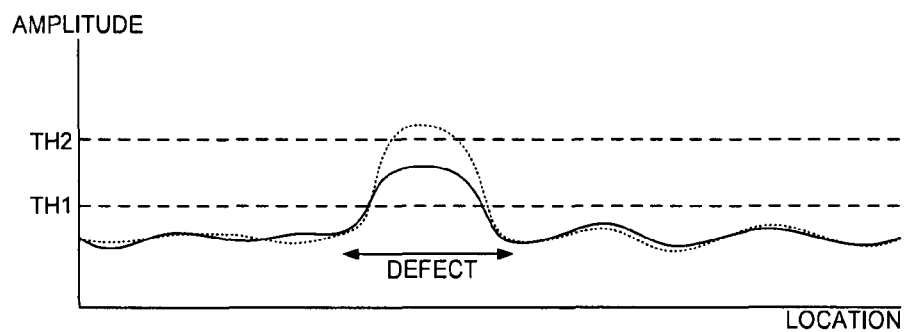
FIGS. 5A-5C show an embodiment of the present invention wherein a drop-in defect is detected when the read signal amplitude rises above a defect threshold.
Figure 5B:
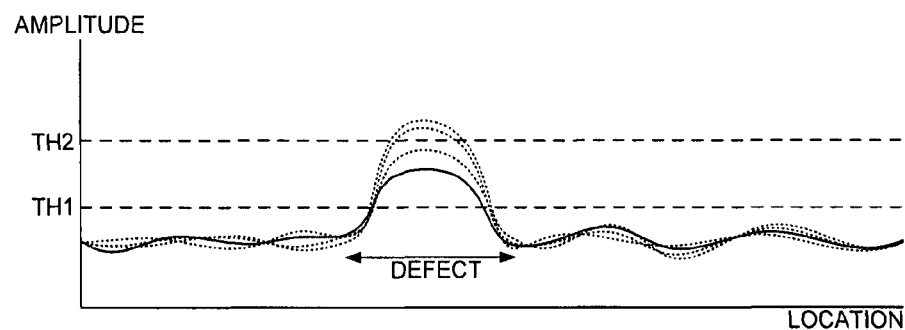
Figure 5C:
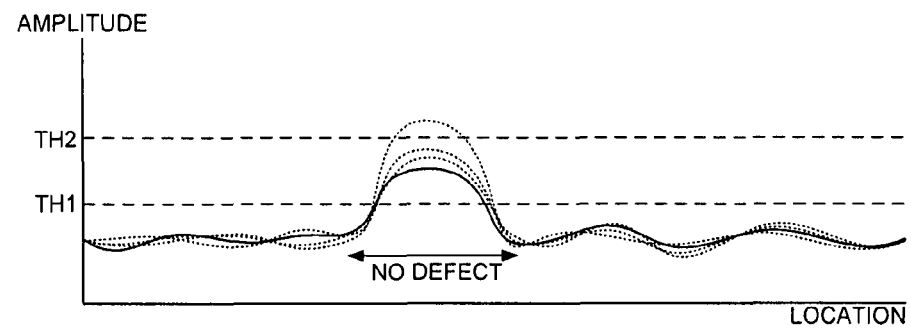

FIGS. 5A-5C illustrate an embodiment of the present invention wherein the control circuitry 6 comprises an amplitude detector for detecting drop-in defects when the amplitude of the read signal rises above a defect threshold. The defect threshold is initialized to a low level TH1, and when the amplitude of the read signal rises above the defect threshold TH1, a defect is detected. After detecting the defect, the defect threshold is increased to a higher level TH2 and the defect verified only if the read signal rises above the defect threshold TH2 at least once during a retry operation, as illustrated in FIG. 5A.

In the embodiment of FIG. 5B, the defect is verified only if the read signal amplitude rises above the adjusted defect threshold (at level TH2) at least M out of N times (2 out 3 times in the example shown). As illustrated in FIG. 5C, there is no defect because the read signal amplitude was above the adjusted defect threshold (at level TH2) less than M out of N times (1 out of 3 times in the example shown).

Performing the initial defect scan using a defect threshold that increases the probability of detecting a defect helps ensure that essentially all marginal sectors are identified. Adjusting the defect threshold to decrease the probability of detecting the defect during the verification phase helps ensure that a sector is actually defective before mapping out one or more data sectors.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 6 comprises suitable logic circuitry, such as state machine circuitry.

What is claimed is:

1. A disk drive comprising:
   a disk comprising a plurality of sectors;
   a head actuated radially over the disk; and
   control circuitry operable to:
      initialize a defect threshold;
      read a first sector to generate a first read signal;
      process the first read signal to detect a defect in the first sector relative to the defect threshold;
      after the defect is detected, adjust the defect threshold;
      reread the first sector to generate a second read signal; and
      process the second read signal to verify the defect in the first sector relative to the adjusted defect threshold.

2. The disk drive as recited in claim 1, wherein the first sector comprises a data sector.

3. The disk drive as recited in claim 1, wherein the first sector comprises a servo sector.

4. The disk drive as recited in claim 2, wherein the control circuitry is further operable to map out the data sector after the defect is detected relative to the adjusted defect threshold.

5. The disk drive as recited in claim 1, wherein the control circuitry is operable to adjust the defect threshold by increasing the defect threshold.

6. The disk drive as recited in claim 1, wherein the control circuitry is operable to adjust the defect threshold by decreasing the defect threshold.

7. The disk drive as recited in claim 1, wherein the control circuitry is operable to adjust the defect threshold to decrease the probability that the defect will be detected relative to the adjusted defect threshold.

8. The disk drive as recited in claim 1, wherein after adjusting the defect threshold the control circuitry is further operable to:
   reread the first sector N number of times and track each time the defect is detected relative to the adjusted defect threshold; and
   map out a data sector if the defect is detected more than once.

9. The disk drive as recited in claim 8, wherein the control circuitry is operable to map out the data sector if the defect is detected at least M out of N times, where M is less than N.

10. The disk drive as recited in claim 1, wherein the control circuitry operable to process the first and second read signals to detect the defect comprises an amplitude detector.

11. The disk drive as recited in claim 1, wherein the control circuitry operable to process the first and second read signals to detect the defect comprises a digital data detector for detecting an estimated data sequence.

12. The disk drive as recited in claim 1, wherein the control circuitry operable to process the first and second read signals to detect the defect comprises a servo demodulator operable to demodulate embedded servo sectors written on the disk.

13. A method of operating a disk drive, the disk drive comprising a disk having a plurality of sectors, and a head actuated radially over the disk, the method comprising:
   initializing a defect threshold;
   reading a first sector to generate a first read signal;
   processing the first read signal to detect a defect in the first sector relative to the defect threshold;
   after the defect is detected, adjusting the defect threshold;
   rereading the first sector to generate a second read signal; and
   processing the second read signal to verify the defect in the first sector relative to the adjusted defect threshold.

14. The method as recited in claim 13, wherein the first sector comprises a data sector.

15. The method as recited in claim 13, wherein the first sector comprises a servo sector.

16. The method as recited in claim 14, further comprising mapping out the data sector after the defect is detected relative to the adjusted defect threshold.

17. The method as recited in claim 13, wherein adjusting the defect threshold comprises increasing the defect threshold.

18. The method as recited in claim 13, wherein adjusting the defect threshold comprises decreasing the defect threshold.

19. The method as recited in claim 13, wherein the defect threshold is adjusted to decrease the probability that the defect will be detected relative to the adjusted defect threshold.

20. The method as recited in claim 13, wherein after adjusting the defect threshold further comprising:
   rereading the first sector N number of times and track each time the defect is detected relative to the adjusted defect threshold; and
   mapping out a data sector if the defect is detected more than once.

21. The method as recited in claim 20, wherein the data sector is mapped out if the defect is detected at least M out of N times, where M is less than N.

22. The method as recited in claim 13, wherein processing the first and second read signals to detect the defect comprises detecting an amplitude of the first and second read signals.

23. The method as recited in claim 13, wherein processing the first and second read signals to detect the defect comprises detecting an estimated data sequence.

24. The method as recited in claim 13, wherein processing the first and second read signals to detect the defect comprises demodulating embedded servo sectors written on the disk.

25. A disk drive comprising:
- a disk comprising a plurality of sectors;
- a head actuated radially over the disk; and
- a means for initializing a defect threshold;
- a means for reading a first sector to generate a first read signal;
- a means for processing the first read signal to detect a defect in the first sector relative to the defect threshold;
- after the defect is detected, a means for adjusting the defect threshold;
- a means for rereading the first sector to generate a second read signal; and
- a means for processing the second read signal to verify the defect in the first sector relative to the adjusted defect threshold.

* * * * *